United States Patent Office 2,987,762
Patented June 13, 1961

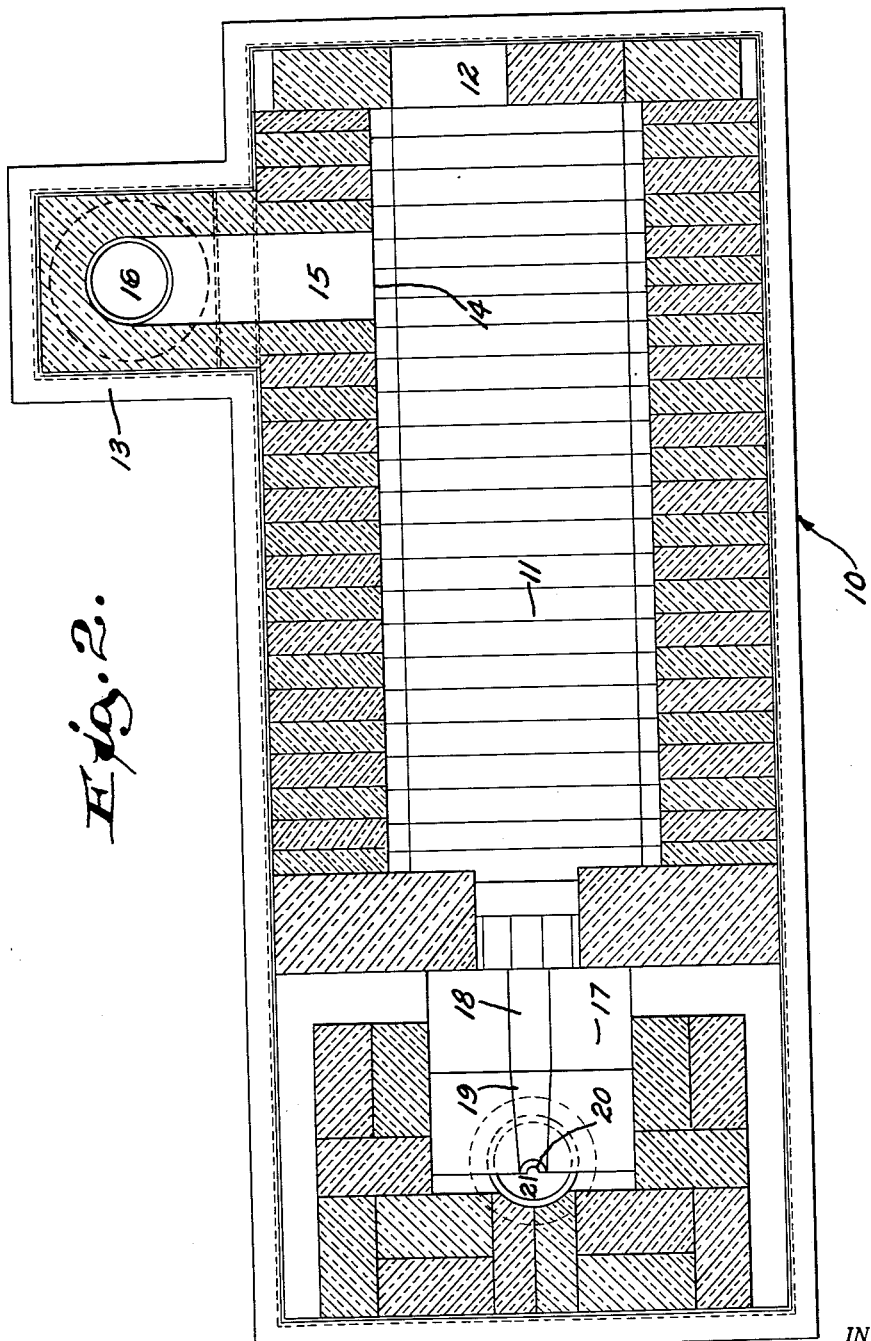

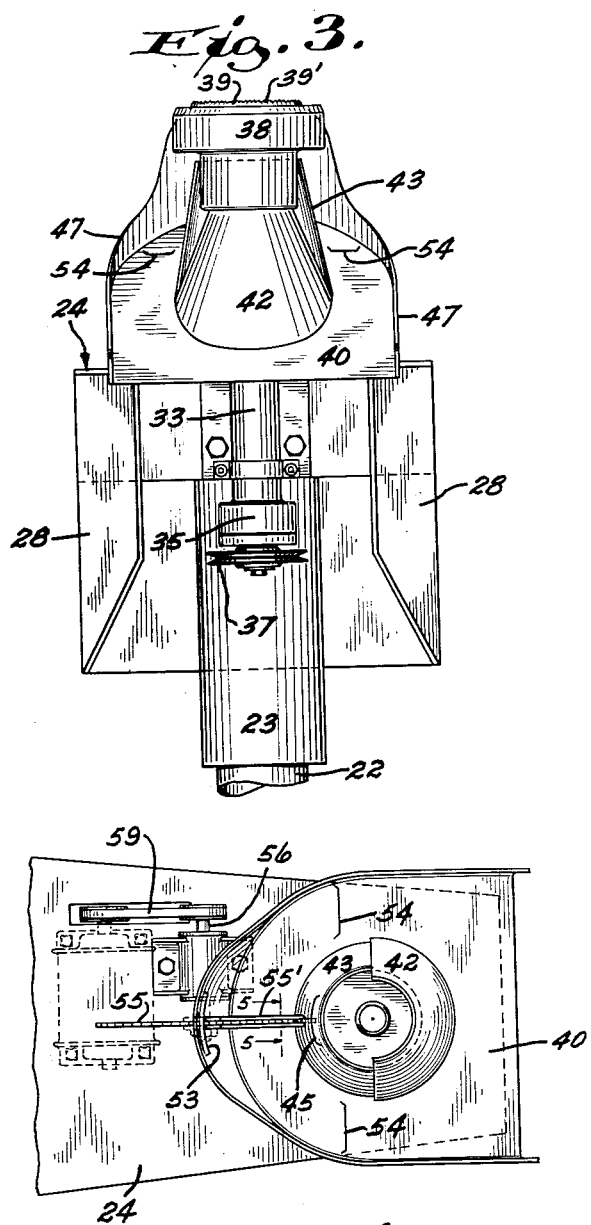

1

2,987,762
APPARATUS FOR MANUFACTURING MINERAL WOOL
Miles S. Firnhaber, Rte. 3, Pewaukee, Wis.
Filed Nov. 20, 1958, Ser. No. 775,203
13 Claims. (Cl. 18—2.5)

This invention relates to improvements in apparatus for manufacturing mineral wool, and more particularly glass fiber.

It has heretofore been proposed to manufacture mineral wool by the use of a rotor which centrifugally throws the molten material from the rim of the rotor. In connection with such rotors there is usually a ceramic material thereon which must be replaced at regular intervals. Normally such replacement requires the shutting down of the device for whatever period is necessary to effect replacement. In addition, the rotor cannot be again put in use until the new ceramic material has been brought up to proper heat.

It is a general object of the present invention to provide an improved device which makes it possible to replace the ceramic material without loss of production time.

A more specific object of the invention is to provide apparatus for manufacturing mineral wool wherein there is a rotary table and wherein a plurality of fiber producing rotors are carried by the same table, whereby when one rotor is in operative position another rotor is in a position where its ceramic top may be removed and replaced.

A further object of the invention is to provide apparatus as above described including a novel glass furnace, the latter heaving an outlet for discharging molten glass and having another outlet spaced laterally therefrom for discharging hot gases, the furnace being so positioned that the hot gases are directed against one rotor to bring its ceramic material up to heat, while the other rotor is in operative position receiving a stream of molten glass from the other furnace outlet.

A further object of the invention is to provide a device as above described having novel means for directing cooling air in the vicinity of the rotor and onto the shaft and bearing for the rotor.

A further object of the invention is to provide a device as above described having a fiber collecting trough and a saw in said trough so arranged that formed fibers having a saw in said trough so arranged that formed fibers from the rotor are blown against the saw to be cut into shorter lengths and thus prevented from roping around the center column.

Other objects of the invention are to provide apparatus for manufacturing mineral wool which is relatively simple, which is efficient in operation, and which is capable of producing a high quality product.

With the above and other objects in view, the invention consists of the improvements in apparatus for manufacturing mineral wool, and all of its parts and combinations, as set forth in the claims, and all equivalents thereof.

In the accompanying drawings, illustrating one complete embodiment of the prefererd form of the invention, in which the same reference numerals designate the same parts in all of the views:

FIG. 2 is a horizontal sectional view taken approximately on the line 2—2 of FIG. 1;

FIG. 3 is an end view of the rotary table showing one of the fiberizing units, the rotor portion being broken away;

FIG. 4 is a fragmentary top view of the structure of FIG. 3 with the rotor removed; and FIG. 5 is a fragmentary sectional view taken along the line 5—5 of FIG. 4.

Figure 1:
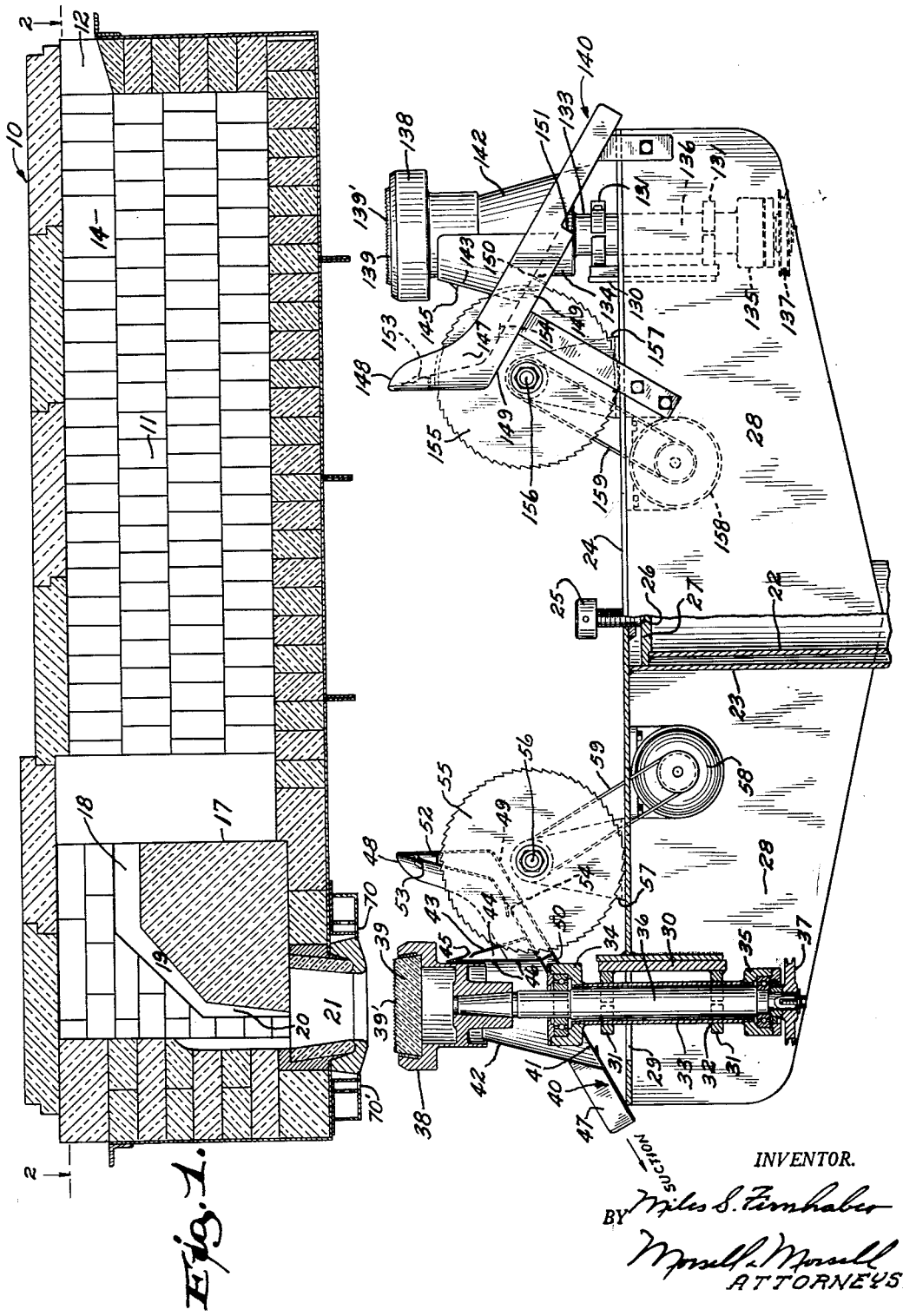
FIG. 1 is a view principally in vertical section showing the furnace and associated rotary table, part of the latter being shown in front elevation.

Referring more particularly to the drawing, the numeral 10 designates a glass melting furnace formed of suitable refractory material and having a chamber 11 for molten glass, there being a feed opening 12. Projecting laterally from one side of the furnace is an extension 13. A hot gas discharge opening 14 in the side of the furnace above the level of the molten material therein is connected by a passageway 15 with an offset vertical chamber 16 having a bottom discharge opening. Near the opposite end of the furnace from the gas opening 14 is a dam 17 having a top trough 18 into which molten material from the chamber 11 is adapted to overflow. The top trough 18 communicates with a downwardly inclined trough section 19 and with a vertical tapered trough section 20, the latter being adapted to discharge through the center of a discharge opening 21 in the bottom of the furnace at one end thereof.

An upright standard 22 is telescopically received within a sleeve 23 depending from the center of a rotary table 24 in such a manner that the table can be rotated around the standard 22. An adjustment screw 25 in the top of the table has its lower end adapted to engage a recess 26 in a cap 27 at the top of the standard 22. By manipulating the screw the height of the table may be varied. The table may include sides 28. The table is shown as carrying two fiberizing units, but it is to be understood that more than two may be utilized. As shown in FIG. 1 the table is elongated and there is one fiberizing unit at each end. Inasmuch as these units are identical, only one will be described in detail, and the same reference numerals preceded by the digit "1" will be applied to corresponding parts of the other unit.

Welded to a margin of a hole 29 at one end of the table top is an upright plate assembly 30 having vertically-spaced horizontal supports 31 projecting therefrom. The supports are bored as at 32 to receive a fixed sleeve 33. The latter carries bearing assemblies 34 and 35 at its upper and lower ends respectively. A shaft 36 is rotatable in the sleeve 33 and in the bearing assemblies 34 and 35. The shaft has a lower end of reduced diameter carrying a pulley 37 which may be driven from a suitable source of power. The upper end of the shaft 36 is also of reduced diameter and projects upwardly beyond the bearing assembly 34, a substantial distance where it carries a fiberizing rotor 38 having a replaceable inlay 39 of ceramic material provided with a multiplicity of fiberizing serrations 39'.

Suitably supported to extend at an oblique angle, as shown, is a trough 40 having a bottom opening 41 into which the bearing assembly 34 projects. Projecting upwardly from the bottom of the trough and surrounding the forward portion of the opening 41 is a curved shield 42. Another curved shield 43 surrounds the rear portion of the hole 41, bearing assembly 34, and projecting shaft 36. A rear shield portion 43 comprises spaced walls to provide an air chamber 44 therebetween, there being a louver 45 in the outer walls and other louvers 46 in the inner wall for a purpose to be hereinafter described. The front and rear shield portions cooperate to surround the projecting end of the shaft 36 and bearing assembly 34, and the lower ends of the shields are suitably secured to the bottom of the trough 40. The trough 40 has an upturned nose 48 at its inner end. Spaced below the upper portion of the trough proper is an auxiliary bottom wall 49 providing an air channel 50 between said auxiliary bottom portion 49 and the bottom of the trough proper. The channel is adapted to receive into its lower end 51 air under pressure from any suitable source (this lower end is best illustrated on the other side of the device where it is identified by the numeral 151). The auxiliary bottom 49 bends upwardly to join the upper end of the nose 48 so that there is also a vertical channel portion 52. Air from the latter portion is discharged through louvers 53. Side members 47 close the sides of the channels 50 and 52 and project upwardly beyond the bottom 40 of the trough proper. Air from the bottom channel portion 50 is also discharged through the bottom of the trough through louvers 54 which aid in discharge of the fibers.

The upper portion of the trough bottom and nose extension 48 together with the auxiliary bottom 49, are slit at at 55' to receive a projecting portion of a rotary saw blade 55, with the slit shielded as shown in Fig. 5 to prevent air from the air channel 50 from escaping through the saw slit 55'. The saw is mounted rigidly on a horizontal shaft 56 suitably journaled in bearings 57 which project upwardly from the table 24. This shaft may be suitably driven by an electric motor 58 carried by the underside of the table through any suitable means, such as the endless drive 59.

*Operation*

The rotor table 24 is so supported that when the rotor 38 is beneath the molten glass discharge opening 21, the rotor 138 on the other side of the table is positioned beneath the hot gas discharge 16 at the opposite end of the furnace. With the furnace in operation, molten glass in the melting chamber 11 will continually overflow through the trough 18. From the trough 18 it will be directed by the trough portions 19 and 20 onto the ceramic top 39 of the rotor 38 together with hot flame. The top 39 of the rotor has fiberizing serrations 39' and is driven at relatively high speed through any suitable connection with the pulley 37. The rotation of the rotor causes the molten glass to be thrown centrifugally in the form of fibers from the serrations, hot air or gases being discharged from the annular series of holes 70 to aid in the fiberizing action. Part of the centrifugally thrown material is caught by the upstanding nose portion 48 of the trough. The majority of it, however, is blown or carried by suction into a receptacle or forming room. The air from the louvers 45, 53 and 54 (or 145, 153 or 154 on the other rotor) cools the fibers and the air from the louvers 45 and 53 (or 145 and 153) directs the fibers against the saw blade so that they are cut into shorter lengths and are thus prevented from roping around the center shield. The lower end of the trough 40 is under the influence of a strong suction which is constantly pulling the fibers forwardly and downwardly into a collecting receptacle or forming room. Those fibers which are pulled off of the forward portion of the rotor are in no danger of roping. Only those which are thrown off of the back of the rotor would normally cause trouble if it were not for the novel construction of the present invention. Due to the air which is discharged from the louvers, and due to the action of the saw blade, these fibers are quickly reduced to too short a length to cause trouble, and they are then acted upon by the downward suction.

The ceramic material 39 must be replaced at regular intervals. Heretofore it has been necessary to shut down operation in order to effect such replacement. With the present invention, however, it is merely necessary to rotate the table 24 180°. This brings the alternate rotor 138 with a new ceramic 139 therein into operative position. The recently used rotor 38 is then in a position where its ceramic material 39 can be readily replaced while glass is being fiberized by the alternate rotor 138. As soon as the ceramic material has been replaced, a suitable closure for the hot gas discharge 16 may be opened to cause hot gasses to be discharged against the new ceramic material. This ceramic material is thus brought up to proper heat so that it will be hot when the next rotor shift is made.

In addition to discharging air under pressure from the louvers 45, 53 and 54 to act on the glass fibers so as to cool the latter and prevent roping, other air from the chamber 44 is directed in an inward direction out of the openings 46 against the bearing assembly 34 to keep the latter as well as the shaft 36 cool, as shown in FIG. 1.

Various changes and modifications may be made without departing from the spirit of invention, and all such changes are contemplated as may come within the scope of the claims.

What I claim is:

1. Apparatus for manufacturing mineral wool comprising a furnace having a discharge opening for molten material and having a hot gas discharge opening which is spaced from said first-mentioned discharge opening, a table supported for rotation adjacent said furnace and openings, two fiberizing units supported in diametrically opposite positions on said table, each including a rotor which is so located that when one rotor is in operative position adjacent said discharge opening to receive molten material therefrom the other rotor is adjacent said hot gas discharge opening to be pre-heated thereby, said positions being reversible upon rotation of the table.

2. Apparatus for manufacturing mineral wool comprising a furnace having a downwardly facing discharge opening for molten material and having a downwardly facing discharge opening for hot gases laterally spaced from said first-mentioned discharge opening, a table supported for rotation on a vertical axis below said furnace and openings, and two fiberizing units supported in diametrically opposite positions on said table, each unit including a horizontally disposed rotor, said rotors being in such a position on the table that when one rotor is beneath the molten material discharge opening the other rotor is beneath the hot gas discharge opening, and said positions being reversible upon rotation of the table.

3. In an apparatus for manufacturing mineral wool having an upright rotor shaft, an inclined trough having a lower discharge end and having a bottom with an opening intermediate its length through which said shaft extends and having an upturned nose at one end, a rotor carried by the upper end of said shaft above said trough, a shield projecting upwardly from the bottom of the trough and surrounding the portion of the shaft which projects above the trough, a saw mounted for rotation on a horizontal axis and having a peripheral portion projecting through said trough, between its nose and said shield, said nose projecting above the periphery of the saw, and means for directing fibers discharged from the rotor against said saw and air means directed from the upper end of the trough toward its lower discharge end for changing the direction of movement of the fibers and for urging all of them in a direction longitudinally of the trough out of the lower discharge end thereof.

4. In an apparatus for manufacturing mineral wool having an upright rotor shaft, an inclined trough having a lower discharge end and having a bottom with an opening intermediate its length through which said shaft extends, and having an upturned nose at one end, a rotor carried by the upper end of said shaft above said trough, a shield projecting upwardly from the bottom of the trough and surrounding the portion of the shaft which projects above the trough, a saw mounted for rotation on a horizontal axis and having a peripheral portion projecting through said trough between its nose and said shield, said nose projecting above the periphery of the saw, and air blast means directed from said nose toward the lower discharge end of the trough for changing the direction of movement of the fibers and for urging all of them in a direction longitudinally of the trough out of the discharge end thereof.

5. In an apparatus for manufacturing mineral wool having an upright rotor shaft and having a bearing supporting said shaft for rotation, and having means for delivering a fiberizing blast, an inclined trough having a bottom with an opening through which said shaft extends and into which said bearing projects, a rotor carried by the upper end of said shaft above said trough, a shield projecting upwardly from the bottom of the trough and surrounding said bearing and the portion of the shaft which projects above the trough, said shield including an air chamber, means for directing cooling air into said air chamber, and means in said shield for directing said cooling air from the air chamber against said shaft and bearing.

6. In an apparatus for manufacturing mineral wool having an upright rotor shaft mounted for rotation and having means for delivering a fiberizing blast, an inclined trough having a bottom with an opening through which said shaft extends, a rotor carried by the upper end of said shaft above said trough, a shaft shield projecting upwardly from the bottom of the trough, said trough having a lower discharge end and having an upper end provided with an upright nose positioned to intercept some of the mineral wool fibers thrown from the rotor, and means including an air conduit in said trough positioned to direct air from said nose portion transversely of the direction of movement of the fibers as a result of the fiberizing blast and in a direction longitudinally of said trough toward the discharge end thereof so as to urge all of the fibers toward said discharge end.

7. In an apparatus for manufacturing mineral wool fibers having an upright rotor shaft mounted for rotation, an inclined trough having a lower discharge end and having a bottom with an opening through which said shaft extends, a rotor carried by the upper end of said shaft above said trough, a shaft shield projecting upwardly from the bottom of the trough, said trough having an upper end provided with an upright nose positioned to intercept fibers thrown from the rotor, means including an air conduit in said trough for directing air from said nose portion and from hte bottom of the trough onto said intercepted fibers, and a saw mounted for rotation on a horizontal axis and having a peripheral portion projecting through the bottom of said trough between said shield and nose in the path of some of said air, said air directing means in the nose being positioned to move the air longitudinally of the trough toward the lower discharge end to change the direction of movement of the fibers and urge them all out of the discharge end of the trough.

8. In an apparatus for manufacturing mineral wool fibers having an upright rotor shaft mounted for rotation, an inclined trough having a lower discharge end and having a bottom with an opening through which said shaft extends, a rotor carried by the upper end of said shaft above said trough, a shaft shield projecting upwardly from the bottom of the trough, said trough having an upper end provided with an upright nose, a saw mounted for rotation on a horizontal axis and having a peripheral portion projecting through the bottom of said trough between said shield and nose, and means including air conduits in said trough nose for blowing fibers thrown from the rotor against said projecting saw portion.

9. In an apparatus for manufacturing mineral wool fibers having an upright rotor shaft mounted for rotation and having means for delivering a fiberizing blast, an inclined trough having a lower discharge end and having a bottom with an opening through which said shaft extends, a rotor carried by the upper end of said shaft above said trough, a shaft shield projecting upwardly from the bottom of the trough, said trough having an upper end provided with an upright nose, a saw mounted for rotation on a horizontal axis and having a peripheral portion projecting through the bottom of said trough between said shield and nose, and means including air conduits in said trough communicating with said shield and nose for blowing fibers thrown from the rotor against said projecting saw portion, said nose air conduit being positioned to direct air longitudinally of the trough toward the discharge end thereof to change the direction of movement of the fibers as previously moved by said fiberizing blast and move them all toward the discharge end of the trough.

10. Apparatus for manufacturing mineral wool comprising means having an opening for discharge of molten material, means for discharging hot gas which is spaced from said molten material discharge, a table supported for rotation adjacent said discharge means, a plurality of fiberizing units supported in spaced positions on said table, each including a rotor which is so located that when one rotor is in operative position adjacent said discharge means for molten material to receive molten material therefrom, another rotor is adjacent said hot gas discharge to be preheated thereby, and means for rotating said table to bring said preheated rotor into operative position.

11. Apparatus for manufacturing mineral wool comprising a furnace having a discharge opening for molten material, there being a hot gas discharge means spaced from said molten material discharge opening, a table supported for rotation adjacent said furnace and discharge means, a plurality of fiberizing units supported in spaced position on said table, each including a rotor which is so located that when one rotor is in operative position adjacent said discharge opening to receive molten material another rotor is adjacent said hot gas discharge means to be preheated thereby, and means for rotating said table to bring a preheated rotor into operative position.

12. In an apparatus for manufacturing mineral wool fibers having an upright rotor shaft mounted for rotation and having means for delivering a fiberizing blast, an inclined trough toward which said fiberizing blast is directed and having a bottom opening intermediate its length through which said shaft extends, a rotor carried by the upper end of said shaft above said trough, a shaft shield projecting upwardly from the bottom of the trough, said trough having a lower end and having an upper end provided with an upright nose, means including air conduits in said trough independent of said fiberizing blast for changing the direction of movement of said fibers and for continuously moving fibers toward and out of the lower end of said trough.

13. Apparatus for manufacturing mineral wool comprising a furnace having a discharge means for molten material, a table supported for rotation adjacent said furnace and discharge means, a plurality of fiberizing units supported in spaced position on said table, each including a rotor which is so located that when one rotor is in operative position adjacent said discharge means to receive molten material another rotor is in a remote position for repair, and means for rotating said table to bring a repaired rotor into operative position.

References Cited in the file of this patent

UNITED STATES PATENTS

| | | |
|---|---|---|
| 1,015,537 | Blue | Jan. 23, 1912 |
| 1,626,702 | Soubier | May 3, 1927 |
| 2,133,235 | Slayter | Oct. 11, 1938 |
| 2,156,982 | Harford et al. | May 2, 1939 |
| 2,189,822 | Thomas et al. | Feb. 13, 1940 |
| 2,194,727 | Vello | Mar. 26, 1940 |
| 2,228,614 | Soubier et al. | Jan. 14, 1941 |
| 2,234,087 | Rosengarth et al. | Mar. 4, 1941 |
| 2,289,524 | Smith et al. | July 14, 1942 |
| 2,609,566 | Slayter et al. | Sept. 9, 1952 |
| 2,618,013 | Weigand et al. | Nov. 18, 1952 |
| 2,814,828 | Svende | Dec. 3, 1957 |

FOREIGN PATENTS

| | | |
|---|---|---|
| 1,154,476 | France | Nov. 4, 1957 |